(12) United States Patent
Romedahl et al.

(10) Patent No.: US 7,861,939 B2
(45) Date of Patent: Jan. 4, 2011

(54) METHODS AND ARRANGEMENT IN AN INFORMATION MANAGEMENT SYSTEM

(76) Inventors: Lars Romedahl, Kantorsgränd 33, SE-192 72 Sollentuna (SE); Daniel Witalis, Villavägen 186, SE-137 38 Västerhaninge (SE); Björn Fransson, Svartviksslingan 67, SE-167 38 Bromma (SE)

( * ) Notice: Subject to any disclaimer, the term of this patent is extended or adjusted under 35 U.S.C. 154(b) by 1182 days.

(21) Appl. No.: 10/578,253

(22) PCT Filed: Nov. 16, 2004

(86) PCT No.: PCT/SE2004/001665
§ 371 (c)(1),
(2), (4) Date: May 4, 2006

(87) PCT Pub. No.: WO2005/050549
PCT Pub. Date: Jun. 2, 2005

(65) Prior Publication Data
US 2007/0043685 A1 Feb. 22, 2007

Related U.S. Application Data

(60) Provisional application No. 60/520,642, filed on Nov. 18, 2003.

(30) Foreign Application Priority Data
Nov. 18, 2003 (SE) .................................. 0303058

(51) Int. Cl.
*G06K 19/06* (2006.01)

(52) U.S. Cl. ...................... 235/494; 235/454

(58) Field of Classification Search ................ 235/454, 235/494; 345/173, 419, 682
See application file for complete search history.

(56) References Cited

U.S. PATENT DOCUMENTS

| | | | |
|---|---|---|---|
| 6,330,976 B1 | 12/2001 | Dymetman et al. | |
| 6,502,756 B1 | 1/2003 | Fåhraeus | |
| 6,570,104 B1 | 5/2003 | Ericson et al. | |

(Continued)

FOREIGN PATENT DOCUMENTS

JP         4-95119 A         3/1992

(Continued)

OTHER PUBLICATIONS

USPTO Office Action, U.S. Appl. No. 10/516,594, mailed Dec. 10, 2009. 21 pgs.

(Continued)

*Primary Examiner*—Thien M Le
(74) *Attorney, Agent, or Firm*—Finnegan, Henderson, Farabow, Garrett & Dunner LLP (57) ABSTRACT

An arrangement and method of allotting pattern units of an overall coding pattern in an information management system, are based on selectively setting a state indicator for each pattern unit to indicate one of a plurality of states. The flow of data in said system may be controlled based on the state indicator. The data may be originally recorded by an electronic pen from a coded product which is provided with at least part of a pattern unit. The product may be generated on demand by requesting an allotment of one or more pattern units.

46 Claims, 4 Drawing Sheets

U.S. PATENT DOCUMENTS

| | | |
|---|---|---|
| 6,663,008 B1 | 12/2003 | Pettersson et al. |
| 6,703,570 B1 | 3/2004 | Russell et al. |
| 6,958,747 B2 | 10/2005 | Sahlberg et al. |
| 2002/0091711 A1 | 7/2002 | Ericson |
| 2003/0046256 A1 | 3/2003 | Hugosson et al. |
| 2003/0061188 A1 | 3/2003 | Wiebe et al. |
| 2003/0091234 A1 | 5/2003 | Lapstun et al. |
| 2003/0094492 A1* | 5/2003 | Kia et al. .................. 235/454 |
| 2005/0060644 A1 | 3/2005 | Patterson |
| 2005/0200610 A1* | 9/2005 | Skantze et al. ............ 345/173 |

FOREIGN PATENT DOCUMENTS

| | | |
|---|---|---|
| WO | WO-99/50787 A1 | 10/1999 |
| WO | WO-00/72110 A2 | 11/2000 |
| WO | WO-00/73981 A1 | 12/2000 |
| WO | WO-01/26032 A1 | 4/2001 |
| WO | WO-01/48591 A1 | 7/2001 |
| WO | WO-01/48678 | 7/2001 |
| WO | WO-01/48685 A1 | 7/2001 |
| WO | WO-01/61450 A2 | 8/2001 |
| WO | WO-01/71473 A1 | 9/2001 |
| WO | WO-01/71475 A1 | 9/2001 |
| WO | WO-01/75781 A1 | 10/2001 |
| WO | WO-02/19260 A1 | 3/2002 |
| WO | WO-02/075629 A1 | 9/2002 |
| WO | WO-02/082366 A1 | 10/2002 |
| WO | WO-03/023595 A1 | 3/2003 |
| WO | WO-2004/038651 A1 | 5/2004 |
| WO | WO-2005/024701 A2 | 3/2005 |

OTHER PUBLICATIONS

USPTO Advisory Action, U.S. Appl. No. 10/516,594, mailed Sep. 1, 2009. 3 pgs.

USPTO Office Action, U.S. Appl. No. 10/516,594, mailed May 13, 2009. 20 pgs.

USPTO Office Action, U.S. Appl. No. 10/516,594, mailed Oct. 14, 2008. 14 pgs.

USPTO Office Action mailed Jul. 7, 2010 in co-pending U.S. Appl. No. 10/516,594, 24 pgs.

* cited by examiner

| PageAddress | State | DocID |
|---|---|---|
| 96.0.0.0 | A | 2H3 |
| 96.0.0.1 | A | 2H3 |
| 96.0.0.2 | A | 1A4 |
| 96.0.0.3 | A | 1A4 |
| 96.0.0.4 | A | 1A4 |
| ... | ... | ... |
| 96.0.0.2516 | A | 3B2 |
| 96.0.1.0 | A | 4Y5 |

FIG. 4B

| AllotmentID | PageAddress | State | DocID | PageCount |
|---|---|---|---|---|
| 1 | 96.0.0.0 | R | 2H3 | 2 |
| 1 | 96.0.0.1 | R | 2H3 | 1 |
| 2 | 96.0.0.2 | R | 1A4 | 3 |
| 2 | 96.0.0.3 | R | 1A4 | 2 |
| 2 | 96.0.0.4 | R | 1A4 | 1 |
| 3 | 96.0.0.5 | A | 3B2 | 1 |
| 4 | 96.0.0.6 | R | 3B2 | 1 |
| 5 | 96.0.0.7 | A | 3B2 | 1 |
| ... | ... | ... | ... | ... |

FIG. 4C

| AllotmentID | PageAddress | State | DocID | PageCount |
|---|---|---|---|---|
| 1 | 96.0.0.0 | R | 2H3 | 2 |
| 1 | 96.0.0.1 | R | 2H3 | 1 |
| 6 | 96.0.0.2 | A | 4Y5 | 3 |
| 6 | 96.0.0.3 | A | 4Y5 | 2 |
| 6 | 96.0.0.4 | A | 4Y5 | 1 |
| 3 | 96.0.0.5 | A | 3B2 | 1 |
| 4 | 96.0.0.6 | R | 3B2 | 1 |
| 5 | 96.0.0.7 | A | 3B2 | 1 |
| ... | ... | ... | ... | ... |

FIG. 4D

| AllotmentID | PageAddress | State | DocID | PageCount |
|---|---|---|---|---|
| - | 96.0.0.0 | R | - | 5 |
| - | 96.0.0.1 | R | - | 4 |
| - | 96.0.0.2 | R | - | 3 |
| - | 96.0.0.3 | R | - | 2 |
| - | 96.0.0.4 | R | - | 1 |
| 3 | 96.0.0.5 | A | 3B2 | 1 |
| 4 | 96.0.0.6 | R | 3B2 | 1 |
| 5 | 96.0.0.7 | A | 3B2 | 1 |
| ... | ... | ... | ... | ... |

FIG. 5

| PageAddress | LastAddress | State | DocID | PageCount | BookCount | PrintID |
|---|---|---|---|---|---|---|
| 96.0.0.0 | 96.0.1.2516 | A | 2H3 | 0 | 2 | |
| 96.1.0.0 | 96.1.0.2 | A | 1A4 | 3 | 0 | |
| 96.1.1.0 | 96.2.1.2516 | A | 2H3 | 0 | 3 | |
| 96.1.0.3 | 96.1.0.4 | A | 3B2 | 1 | 0 | |
| ... | ... | ... | ... | ... | ... | |

METHODS AND ARRANGEMENT IN AN INFORMATION MANAGEMENT SYSTEM

CROSS-REFERENCE TO RELATED APPLICATIONS

The present application claims the benefit of Swedish patent application No. 0303058-2, filed on Nov. 18, 2003, and U.S. Provisional patent application No. 60/520,642, filed on Nov. 18, 2003, which both are hereby incorporated by reference.

FIELD OF THE INVENTION

The present invention relates generally to collecting and processing of information. More specifically, the invention concerns on demand generation of position-coded bases and transmission of information recorded from such bases.

BACKGROUND ART

Electronic pens can be used for generation of electronic information that reflects handwritten entries on a base. It would be desirable to incorporate such electronic pens in an information management system such that the electronic information could be efficiently conveyed to different destination units for further processing.

In US 2003/0061188, US 2003/0046256 and US 2002/0091711, which are herewith incorporated by reference, the present Applicant has suggested such information management systems in which a position code is applied to each base to code a plurality of absolute positions thereon. By reading the position code, the electronic pens are capable of electronically recording a sequence of positions that reflect their own motion on the base.

The position code on each base is a subset of a much larger abstract position-coding pattern. Examples of such abstract patterns are given in U.S. Pat. No. 6,663,008, U.S. Pat. No. 6,570,104 and U.S. Pat. No. 6,330,976, which are herewith incorporated by reference.

The abstract pattern may be dynamically or statically divided into subsets of given size, each such subset being associated in the system with a unique identifier. If each subset is intended for a respective physical page, it is denoted a pattern page and is represented by a unique page address. In such a case, each absolute position may be represented by a page address and a local position within the associated pattern page.

By designating different parts of the abstract pattern to different destination units, the electronic information can be automatically directed from the pen to the correct destination unit for processing. For example, the system may include an intermediary server which, upon receipt of one or more absolute positions from a pen, identifies an associated network address of the correct actor and directs the flow of data to this address.

It might be desirable to provide for on-demand generation of coded bases, e.g. by means of digital printers, in an information management system of the above-identified type. Such systems are disclosed in Applicant's co-pending PCT application WO 04/038651, which was unpublished at the filing of the present application and is herewith incorporated by reference. These systems include a printing tool that allows a user to request the printing of an electronic document as a coded base. Upon such request, the printing tool obtains a subset of the abstract pattern from a position assigner. The position assigner also provides electronic allocation data in the system which allows the intermediary server to direct the flow of data to the correct network address.

There is a need to provide, in such a print on demand system, a technique to designate parts of the coding pattern efficiently, transparently and in real time.

SUMMARY OF THE INVENTION

It is an object of the present invention to fulfill the above-mentioned need.

This and other objects, which will be evident from the following description, are achieved wholly or partly by methods and an arrangement for allotting pattern units of an overall coding pattern as set forth in the independent claims. Embodiments are defined by the dependent claims.

BRIEF DESCRIPTION OF THE DRAWINGS

Presently preferred embodiments of the invention will be described in more detail below with reference to the accompanying drawings.

DESCRIPTION OF PREFERRED EMBODIMENTS

Figure 1:
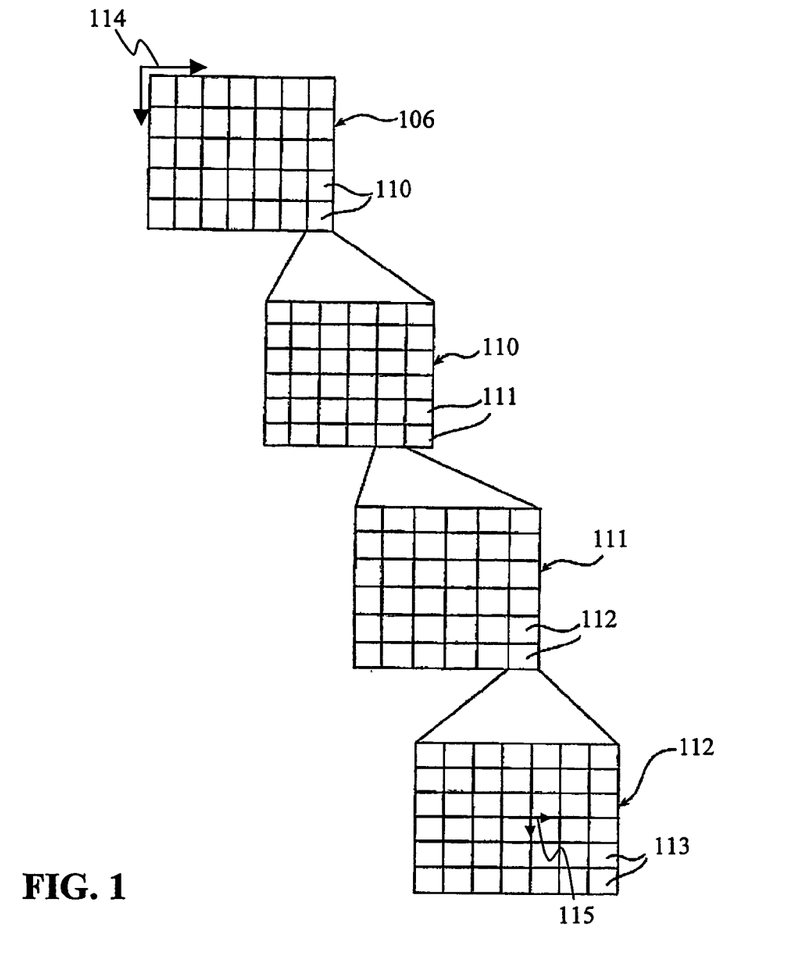
FIG. 1 shows a logical partitioning of an abstract position-coding pattern into an addressable tree structure of pattern pages.

The following description is based on the use of the above-identified abstract position-coding pattern, which is subdivided into page units. The page units are addressable in a hierarchy of subordinate subsets of the pattern. FIG. 1 shown an example, in which the overall pattern 106 contains "segments" 110 which in turn are divided into a number of "shelves" 111, each containing a number of "books" 112 which are divided into a number of aforesaid page units 113, also called "pattern pages". Suitably, all pattern pages have the same format within one level of the above pattern hierarchy. For example, some segments or shelves may consist of pattern pages in A4 format, while other consists of pattern pages in A5 format. The identification of a certain pattern page in the abstract pattern can be noted as a page address of the form: segment.shelf.book.page, for instance 99.5000.1.1500, more or less like an IP address. For reasons of processing efficiency, the internal representation of the page address may be different, for example given as an integer of a predetermined length, e.g. 64 bits.

In one example, a segment may consist of more than 26,000,000 pattern pages, each with a size of about 50×50 $cm^2$. In one embodiment, at least one such segment is divided into 5,175 shelves, each consisting of 2 books with 2,517 pages each.

Each pattern page may be regarded as an actual subset of the coding pattern, or as the absolute positions that are coded by the subset. Each such absolute position may be represented as a global position in the coordinate system 114 of the overall pattern, or as a page address and a local position in a coordinate system 115 within the corresponding pattern page.

The following description is also based on each product containing position code that corresponds to one or more pattern pages. It is to be noted, however, that the position code on a product need not conform to a pattern page. Thus, one or more subsets from one or more pattern pages may be arbitrarily arranged on the product.

The product may also embed functional areas that each is associated with a particular function to operate on any pen strokes therein. Thus, positions coded by the position code within each such functional area are associated with the particular function. Coded positions that fall outside any such functional areas may be associated with a default function, for example that any such positions should be represented as pen strokes, i.e. result in a pure digitalization of the pen movement.

Each product is represented by a definition file (PAD file) which identifies the page address(es) of the relevant pattern page(s), and defines the mapping of the pattern page(s) on the product, such as the placement and size of each functional area on the pattern page(s), as well as the associated function. Each product is also represented by a graphics file which defines the human-readable information on the product, i.e. the supporting graphics or layout that aims at instructing, controlling and/or informing a user.

A suitable electronic pen may represent its motion on a position-coded product as either a sequence of global positions or a page address and a sequence of local positions on the corresponding pattern page. In either case, a physical pen stroke is recorded by the pen as an electronic pen stroke in the form of a sequence of absolute positions.

Figure 2:
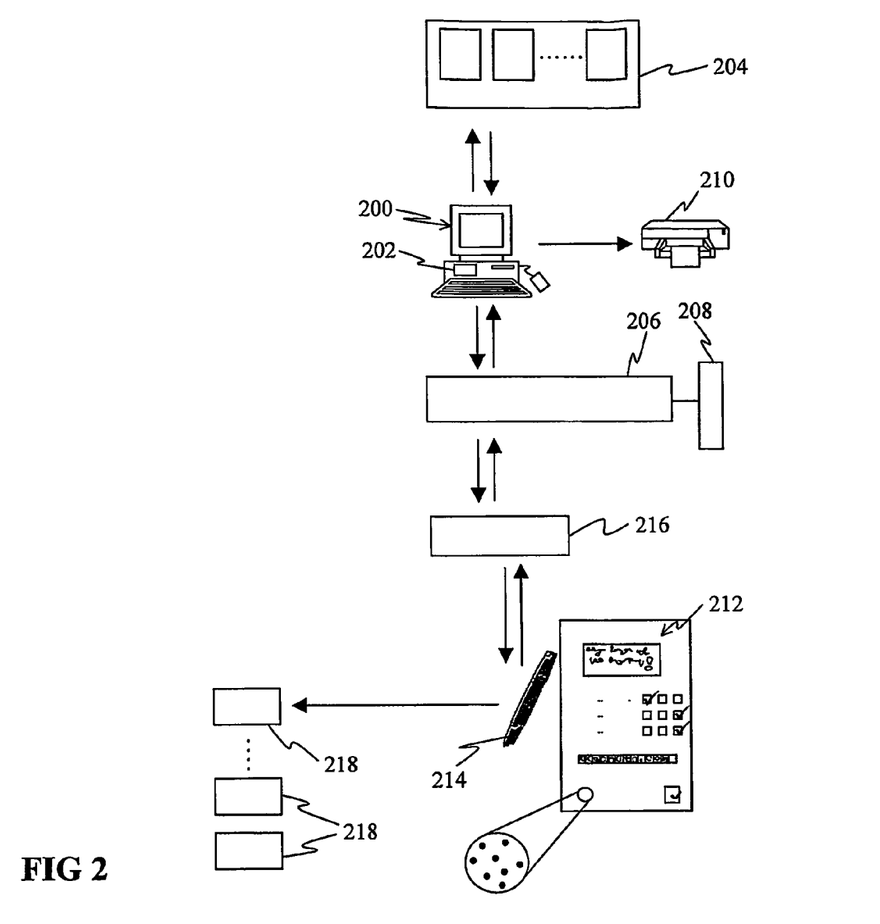
FIG. 2 shows an information management system based on the position-coding pattern of FIG. 1, including components for on demand printing of coded products.

FIG. 2 illustrates an information management system with print on demand capability. A printing tool 200, in the form of a dedicated software module 202 which is executed on a personal computer, communicates with a repository 204 which stores graphics files available for printing. The printing tool also communicates with an assigner 206, which has access to a database 208 that represents at least part of the abstract pattern, and a digital printer 210. As will be further described below, the printing tool 200 orchestrates the generation of position-coded product.

The system also includes a flow controller 216, here embodied as a router, which communicates with electronic pens 214 to direct the flow on data to one of several destination units 218.

The repository 204, the assigner 206 and the flow controller 216 are typically network-connected computers with software which, when executed in an internal processor, implements the processes that are performed in the respective units. Likewise, each destination unit 218 is typically a network-connected computer with software that implements one or more services that operate on the information that is recorded with an electronic pen 214 on one or more service-related position-coded products 212.

Via the printing tool 200, a user may select one of the graphics files in the repository 204 for printout. The printing tool then contacts, automatically or on command, the assigner 206 with a request for pattern data. The request may contain an indication of number of pages, number of printout copies, page format (e.g. A4, A3, B4, Letter), etc. Optionally, the indication of the number of pages and/or page format can be replaced by the graphics file being included in the request. Alternatively, the number of pages and/or the page format and/or the number of printout copies are given by standard settings in the assigner 206.

As will be described in further detail below, the assigner 206 then allots one pattern page for each physical page and each printout copy in the request. The assigner also maintains allocation data, which ultimately identifies the appropriate destination unit 218 to receive any information that is recorded from the respective pattern page.

In response to the request for pattern data, the assigner 206 returns assignment data corresponding to the allotted pattern page(s). In the example below, the assignment data includes one or more page addresses. Alternatively, the assignment data may comprise either of two opposite corner positions for the respective pattern page, a file with an algorithm for generating a corresponding position code, or a file containing a corresponding position code. The assignment data may alternatively be represented by a single global position, after which the printing tool 200 can compute the other positions for the allotted pattern page, if the logical partitioning of the abstract pattern (FIG. 1) is known to the printing tool.

The printing tool 200 then compiles a graphics layer, which is given by the graphics file, and a coding layer, which is given by the assignment data, in a printout file which is sent to the printer 210 for printing on a suitable substrate, such as paper, plastic, laminate, etc. Alternatively, this compiling takes place in the printer itself, which also may send the request for pattern data to the assigner 206. In certain cases, access to the PAD file may be necessary for the compiling of the coding layer. To this end, the PAD file can be stored in the repository 204 to be accessible to the printing tool 200. Alternatively, relevant information from the PAD file may be incorporated into the graphics file.

The resulting position-coded product 212 is then distributed to a user, who writes thereon with the electronic pen 214. The pen is subsequently caused to send an address query to the router 216 at a predetermined network address. The address query may contain one or more absolute positions (global position or page address) that have been decoded from the product. The router receives the address query and identifies the network address of the appropriate destination unit 218. This may take place via a corresponding query to the assigner 206 to derive the allocation data which, directly or indirectly, connects the received absolute position to the network address.

For example, each graphics file may have a unique identity (document identifier; docID) in the system, which is registered in the router 216 in association with the network address of the destination unit. If the printing tool 200 conveys the document identifier to the assigner 206, suitably in connection with the request for pattern data, the assigner may store an association between each allotted pattern page and the corresponding document identifier.

In this example, the query from the router 216 to the assigner 206 includes position data (global position or page address) received from the pen. Based upon the position data, the assigner 206 identifies the associated document identifier and returns an indication of this document identifier to the router 216. Based upon this indication, the router identifies the relevant network address. Thus, the router 216 is capable of returning a reply message with the current network address to the pen 214, which may connect to this address and transfer some or all of the absolute positions that it has detected on the product 212.

As an alternative to the router querying the assigner for allocation data, the assigner may be configured to automatically forward allocation data to the router.

The principles, operation and structure of the assigner will now be further described with reference to FIGS. 3-6.

Figure 3:
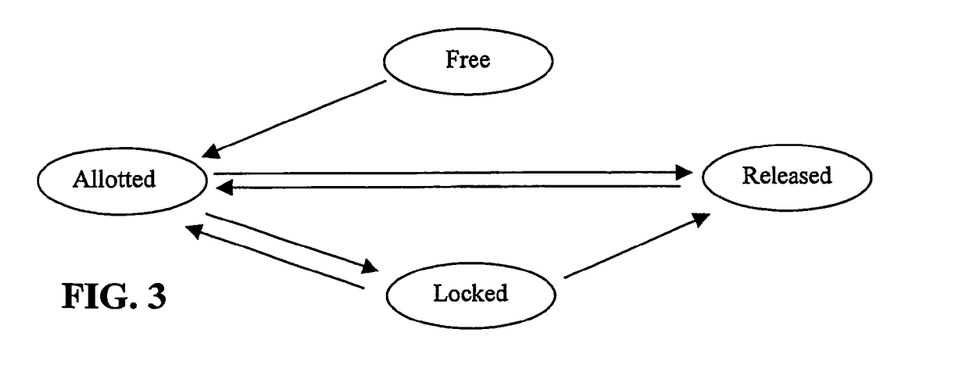
FIG. 3 shows the allowed state transitions for the pattern pages in the system of FIG. 2.

The assigner 206 operates with four different possible states of the pattern pages in the database 208. As indicated in FIG. 3, all pattern pages are initially designated as "Free".

The "Free" state may be changed to an "Allotted" state, indicating that the pattern page has been allotted for printing. Such a pattern page is blocked from further allotment.

The "Allotted" state may be changed to a "Released" state, either automatically, for example a predetermined time after the transition to the "Allotted" state, or upon external request, e.g. by a destination unit. In the "Released" state, the related pattern page is again available for allotment, at least after a predetermined time has elapsed since the transition to the "Released" state. Upon such allotment, the "Released" state is changed to the "Allotted" state.

The "Allotted" state may also be changed to a "Locked" state, in which the allocation data is made inaccessible to the router 216, to thereby block any transfer of information from the related pattern page in the system. The transition "Allotted" to "Locked" may be effected upon external request, e.g. by a destination unit. For example, the destination unit may only allow information to be conveyed from a pattern page a given number of times.

The "Locked" state may be changed back to the "Allotted" state, either automatically, for example a predetermined time after the transition to the "Locked" state, or upon external request, e.g. by a destination unit. Thus, a destination unit can control the use of a given pattern page, for example to provide version control.

The "Locked" state may also be changed to the "Released" state, again upon external request, e.g. by a destination unit.

All requests for state change from an external unit to the assigner may have to be supplemented by authentication data, for example, an identifier (name/address) and a password.

The allotment of pattern pages can be effected according to different principles. In one embodiment, the adequate number of pattern pages for each printout copy is picked out as a set of consecutive pages, given by the page addresses. This principle may result in a more efficient use of the database 208 (FIG. 2), with respect to storage capacity and/or search speed. It may also be preferable that the pattern pages allotted to each printout copy all belong to one and the same book in the pattern hierarchy. It may also be preferable that all pattern pages that have been allotted to one and the same printout copy have their states changed simultaneously. For example, the whole copy of a printed document will be locked for use with the electronic pen if a request for locking of one of the related pattern pages is sent to the assigner, and vice versa in the case of a request for un-locking (transition to "Allotted" state).

It may not be necessary to make use of all the states described above. In one simple example, only the "Free" and "Allotted" states are used. The assigner may have access to a parameter that designates the last pattern page ("Max Page Address") that was allotted in the last request. Upon receiving a request for pattern data, the assigner may operate according to:

1. Read document identifier from request;

2. Read number of pages from request;

3. Read number of copies from request;

4. Obtain current Max Page Address;

5. For each copy:
   5a. Add requested number of pages to Max Page Address to form new Max Page Address;
   5b. If new Max Page Address exceeds book limit, restart allotment on first pattern page in next book and form new Max Page Address;

6. Return page addresses for all allotted pattern pages;

7. Store association between the document identifier and the page addresses of the allotted pages.

Figure 4A:
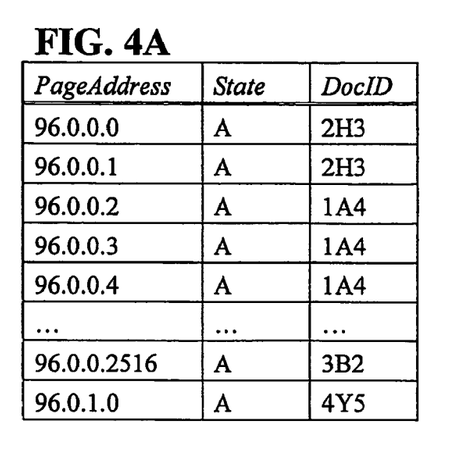
FIGS. 4A-4D illustrate examples of allotment tables used in the system of FIG. 2.

The association may for example be stored in an allotment table as shown in FIG. 4A. In this example, the allotment table only lists the pattern pages in the "Allotted" states (designated by "A"), and contains one record per allotted page. The above parameter "Max Page Address" could be obtained from the last record in this table. The table is also searched by the assigner to retrieve and output a document identifier (docID) upon a request for allocation data from a router in the system.

In a more advanced example, enabling use of all the above states, the assigner operates according to:

1. Read document identifier from request;

2. Read number of pages from request;

3. Read number of copies from request;

4. For each copy:
   4a. Search allotment table to identify a suitable block of pages in "Released" state;

5. If there are not enough suitable blocks of pages in the allotment table, missing blocks are allotted from "Free" pages according to the first example above;

6. Return page addresses for all allotted pattern pages;

7. Store association between the document identifier and the page addresses of the allotted pages.

Each suitable block of pages is a set of consecutive pattern pages within one book, the number of pages being at least equal to the requested number of pages for each copy.

In the above example, the allotment process prioritizes "Released" pages over "Free" pages, i.a. since this will result in fewer records in the allotment table for the same number of allotted pages.

Often, there are many suitable blocks of "Released" pages in the allotment table. The selection of one of many suitable blocks could be based, for example, on any one of the following algorithms, or combinations thereof:

A. First fit, in which the allotment process selects the first block large enough to satisfy the request.

B. Best fit, in which the allotment process always selects the smallest suitable block.

C. Worst fit, in which the allotment process always selects the largest suitable block.

D. Next fit, in which the allotment process resumes searching where the previous one ended.

E. LIFO-ordered first fit, in which the allotment process always selects the most-recently released suitable block.

F. FIFO-ordered first fit, in which the allotment process selects the least recently released suitable block.

Algorithm A may be advantageous for reasons of processing speed. Algorithm B may be advantageous when the allotment requests are similar in size (with respect to the number of requested pages per copy). Algorithm C may be advantageous when the allotment requests are dissimilar in size.

In allotting "Free" pages (step 5 of the second example above), whenever a requested block of pages for a printout copy does not fit within a current book, the allotment is restarted on the first page in the next book, but the remaining pages in the current book are nevertheless entered into the allotment table with the state set to "Released". Thereby, these left-over pages are made available for future allotment.

Figure 4B:
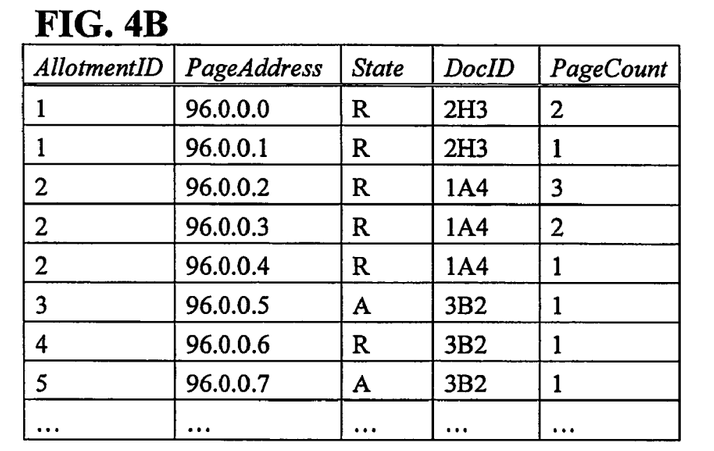
Figure 4C:
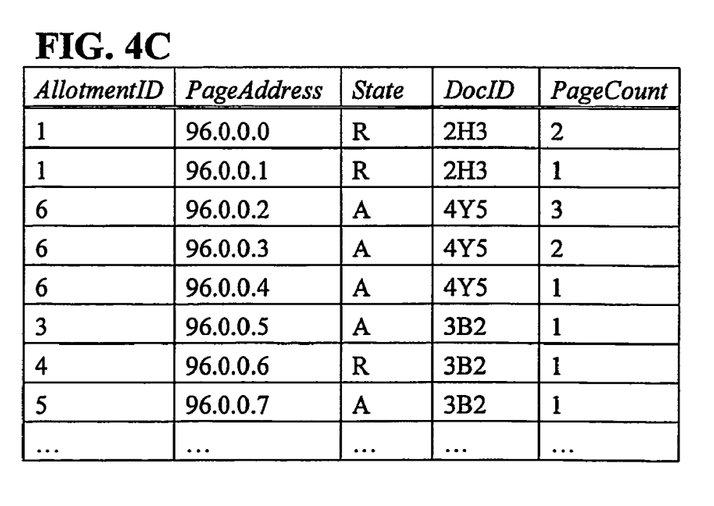

FIG. 4B illustrates another example of an allotment table, which contains one record per allotted page. The AllotmentID field indicates all pages that are allotted to one and the same printout copy. The PageCount field indicates the number of pages available within one allotment (given by the AllotmentID), with the first record thereby indicating the number of consecutive records that belongs to the same allotment.

After an allotment request for one printout copy of three pages, the allotment table would be searched for records with State=R and PageCount>=3. After allotment, the table of FIG. 4B would be updated, resulting in the table of FIG. 4C.

Figure 4D:
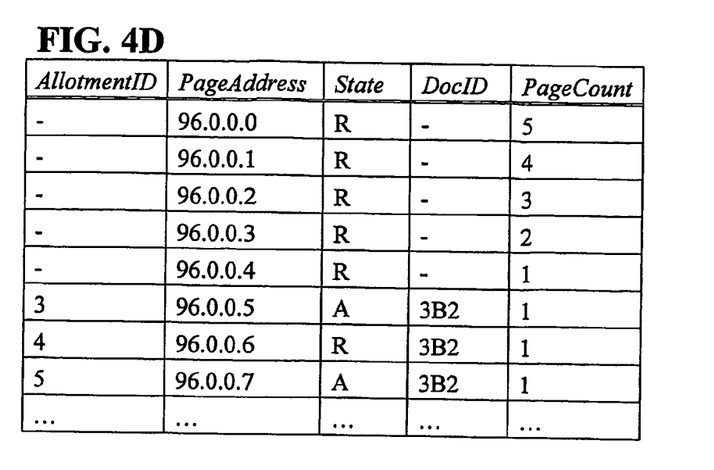

Over time, the allotment table will become more and more fragmented, resulting in reduced performance and poor economization of the abstract pattern. Therefore, a defragmentation process is intermittently effected, in which the allotment table is processed to merge adjacent records of "Released" pages. Thus, the defragmentation process results in larger blocks of released pages being made available for allotment. For example, in the table of FIG. 4B, the defragmentation may result in an update of the PageCount field, as well as a cancellation of the AllotmentID and docID fields, as shown in FIG. 4D.

According to one alternative, all records that are changed from an "Allotted" state to a "Released" state are deleted from the allotment table. Possibly, the deletion is effected a predetermined time period (quarantine period) after the transition to the "Released" state. In essence, such deleted records are set in the "Free" state. In this case, the allotment process may be implemented to locate the suitable blocks as gaps in the allotment table. To reduce the processing intensity and/or increase the processing speed, a field in the allotment table may indicate the number of subsequent "Free" pages. Further, the allotment process may be implemented to search for the suitable blocks in a second allotment table that contains the "Free" pages resulting from deletions in the basic allotment table.

Still further, the allotment table may include additional fields, for example TimeAllotted, TimeLocked, TimeReleased, which may be used in the searching of the table and/or in the changing of states.

Figure 5:
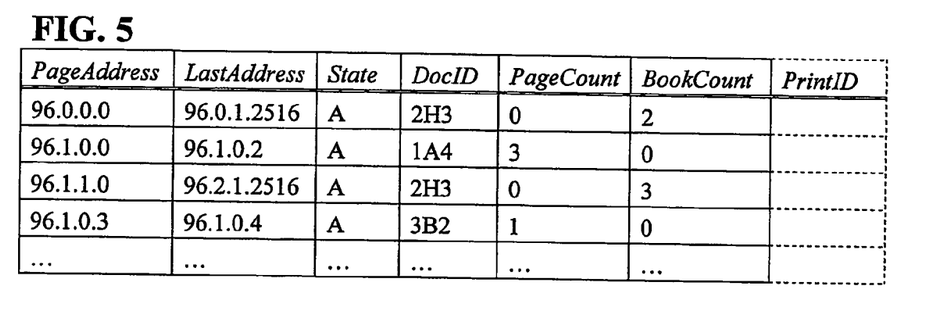
FIG. 5 illustrates yet another example of an allotment table.

As a further alternative, the allotment table may include one record for each printout copy, instead of one record for each allotted pattern page, resulting in a more compact database representation. An example of such an allotment table is shown in FIG. 5, in which a PageCount field indicates the number of pattern pages included in each record. In the case of large print jobs, it is conceivable that entire books are being allotted (batch allocation). For reasons of searching efficiency, the table of FIG. 5 also includes a BookCount field to indicate the number of complete books included in each record.

In the event of a request for allocation of p pages, the allotment process searches the allotment table (FIG. 5) for records having a PageCount>=p and a State=R, selects one such record (e.g. subject to any of the above selection algorithms A-F), and changes the state to "A". If the PageCount of the selected record exceeds p, the allotment process creates a new record for the surplus pages with the state set to "R". If no suitable records are found in the allotment table, the allotment process obtains the parameter "Max Page Address", and allots free pages. The parameter "Max Page Address" may be given by the last page of the record with the largest page address in the allotment table, optionally with the constraint BookCount=0.

The allotment process for a batch allocation of b books is effected analogously to the above, albeit based on BookCount instead of PageCount.

The table of FIG. 5 also includes a LastAddress field, which may facilitate both the above identification of the "Max Page Address", and the identification of allocation data upon a request from the router. In the latter case, a lookup for a given page address PA involves finding the record for which PA>=PageAddress and PA<=LastAddress.

The aforesaid defragmentation process may analogously be effected on the compact representation of FIG. 5.

In a further variant, indicated in FIG. 5, the allotment table comprises a FormInstanceID field which may hold a form instance identifier (printID) that contains characters and/or numbers in an arbitrary base. This printID may be generated by the printing tool to uniquely identify a specific printout (copy) of a graphics file. The printing tool may include the printID in the request for pattern data to the assigner, which may then store an association between the printID and the allotted pattern pages, via the FormInstanceID field.

The printID may be used to identify printout-specific data to be accounted for by the destination unit when processing information recorded from a specific printout. Alternatively or additionally, the printout-specific data may be included in the graphics layer of the printout. In either case, the destination unit may include a received page address in a request for printID which is sent to the assigner. In response to such a request, the assigner may locate a corresponding record in the allotment table, and output the printID given by the FormInstanceID field of that record. The destination unit may then use this printID as is, or use the printID as a key to derive further instance data from a suitable database. For example, the printID may be an employee number which can be used by the receiving destination unit to fetch additional information about that employee, such as an address, a company affiliation, a bank account number, etc.

It should be clear that the allotment table can be implemented in any type of data structure which allows for efficient searching and which is easy to extended, for example a table, a tree, etc. For example, the allotment table may be implemented in a relational database, with Structured Query Language (SQL) being used for making interactive queries to and updating the database. Alternatively, the allotment table may be implemented in an object-oriented programming database.

Figure 6:
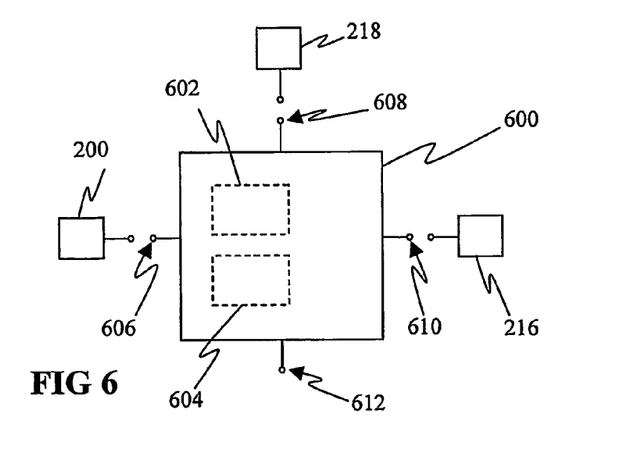
FIG. 6 shows an arrangement for allotting pattern pages in the system of FIG. 2, together with interfacing devices.

In the embodiment of FIG. 6, the assigner 600 includes a memory 602 (e.g. a hard disk, RAM, flash, etc) which holds the allotment table, and a processor 604 (e.g. a microprocessor, CPU, ASIC, FPGA, etc) which executes the processes of the assigner. The assigner has a number of interfaces. A first interface 606 for dynamic pattern allocation allows an interfacing unit, e.g. the printing tool 200 (FIG. 2), to request one or more pattern pages and to obtain the corresponding assignment data. A second interface 608 for handling of allotted pattern allows an interfacing unit, e.g. a destination unit 218 (FIG. 2), to request locking (Allotted→Locked), un-locking (Locked→Allotted) or releasing (Allotted/Locked→Released) of one or more pattern pages, as given by their page addresses. The second interface 608 also allows the interfacing unit to request a form instance identifier (printID), based on a page address. A third interface 610 for allocation data allows an interfacing unit, e.g. the router 216 (FIG. 2), to request and obtain a document identifier (docID) based on a page address. A fourth interface 612 for administration allows a system administrator to view and edit the allotment table, to update the implementing software of the assigner, to initiate a defragmentation process, to selectively or collectively release (Allotted/Locked→Released) one or more pattern pages, to obtain database statistics, such as the number of "Allotted", "Free", "Released" and "Locked" pattern pages, etc.

At least some of these interfaces may be implemented as web services using the Simple Object Access Protocol (SOAP). The web services may be described in the Web Services Description Language (WSDL).

The system of FIG. 2 may include more than one assigner. For reasons of access and security, a sub-system including an assigner may be tailored to a specific company. Ideally, each such sub-system should operate on an exclusive part of the abstract pattern. In practice, however, there may be several sub-systems operating at least partly on the same part of the abstract pattern. In the case of a merger between two such companies, their sub-systems should also be merged to avoid confusion. To minimize conflicts and erratic behavior of the resulting sub-system, a set of state rules are applied pattern page by pattern page when importing an allotment table from a first assigner into a second assigner, for example via the fourth interface 612 (FIG. 6). The following rules designate the state in the first assigner, the state in the second assigner, and the resulting state of the pattern page after merging. The symbol * designates any one of the available states.

Allotted+Free=Allotted
Allotted+Allotted=Locked
Allotted+Locked=Locked
Allotted+Released=Allotted
Locked+*=Locked
Released+*=*
Free+*=*

There are many variations that may be made consistent with the present invention. The foregoing description is presented for purposes of illustration and description. It is not exhaustive and does not limit the invention to the precise form disclosed. Modifications and variations are possible in light of the above teachings or may be acquired from practicing the invention.

In the above embodiments, the "Free" state is implicit in the allotment table, whereas the "Allotted", "Released" and "Locked" states are explicitly recorded. Of course other permutations are conceivable, in which one state is implicit and the other states explicitly recorded in the table. Records in the "Allotted" state are preferably explicitly recorded since they contain the allocation data used by the router. In a further alternative, the allotment table may explicitly record all states of all page addresses of the relevant part of the abstract pattern. Further, the allotment table may be distributed over any plurality of sub-tables.

Instead of locating suitable blocks of consecutive pages, the allotment process may use any other principle, for example allotting the first pattern pages that are available in the allotment table irrespective of block size.

In a further alternative, where different segments, shelves or books consist of pattern pages of different format, the allotment process may be directed to the adequate segments, shelves and books dependent on format information included in the request for pattern data from the printing tool.

It may also to be noted that the allocation data may take any form. In one alternative, the allocation data directly associates each page address with the appropriate network address of the destination unit. Further alternative formats of the allocation data are given in aforesaid PCT application WO 04/038651.

The drawings illustrate the repository, the assigner, and the router as separate physical units. Such a modular construction may be preferred for reasons of administration or manufacture. However, it is possible to implement at least some of them in one and the same physical unit, for instance in order to reduce delays in the system. According to one alternative, the repository and the assigner may be combined in one and the same physical unit. According to another alternative, the assigner and the router may be combined in one and the same physical unit.

The invention claimed is:

1. A method of allotting pattern units of an overall coding pattern in an information management system, in which each pattern unit has a unique pattern address, said method comprising:
   receiving an allotment request for a number of pattern units;
   searching an electronic representation of said overall coding pattern to locate said number of pattern units available for allotting;
   setting a state indicator of said number of pattern units in said representation to indicate an allotted state;
   outputting an indication of the pattern addresses of said number of pattern units; and
   selectively changing, from the allotted state to a released state, the state indicator of at least one pattern unit whose state indicator is set to the allotted state.

2. The method of claim 1, wherein the pattern units are defined in an ordered sequence by the pattern addresses, said searching comprising:
   locating said number of pattern units as consecutive pattern units in said ordered sequence.

3. The method of claim 1, wherein said pattern units are divided into ordered groups, said searching comprising:
   locating said number of pattern units within one of said groups.

4. The method of claim 1, wherein said changing is effected based on an elapsed time since the state indicator was set to the allotted state.

5. The method of claim 1, wherein said changing is effected based on receipt of a request for release.

6. The method of claim 1, wherein said released state indicates that the at least one pattern unit is available for allotting.

7. The method of claim 6, wherein said released state indicates that the at least one pattern unit is available for allotting a predetermined time after the state indicator was set to the released state.

8. The method of claim 1, wherein said searching is at least partly based on the state indicator.

9. The method of claim 8, wherein said searching comprises a re-use step in which searching is effected among pattern units with the state indicator in the released state.

10. The method of claim 9, wherein said searching comprises, if the re-use step is unsuccessful:
    locating said number of pattern units among previously non-allotted pattern units in said representation.

11. The method of claim 1, further comprising:
    selectively changing the state indicator of at least one pattern unit from the allotted state to a locked state.

12. The method of claim 11, wherein said locked state indicates that information relating to the pattern unit is to be blocked from being transferred in said information management system.

13. The method of claim 11, further comprising:
    selectively changing the state indicator of at least one pattern unit from the locked state to the allotted state.

14. The method of claim 13, wherein said changing is effected based on receipt of a request for state change indicating the pattern address of each pattern unit to be affected.

15. The method of claim 11, further comprising:
    selectively changing the state indicator of at least one pattern unit from the locked state to a released state.

16. The method of claim 15, wherein said changing is effected based on an elapsed time since the state indicator was set to the locked state.

17. The method of claim 15, wherein said changing is effected based on receipt of a request for state change indicating the pattern address of each pattern unit to be affected.

18. The method of claim 11, wherein said changing is effected based on receipt of a request for state change indicating the pattern address of each pattern unit to be affected.

19. The method of claim 1, wherein said changing is effected based on receipt of a request for state change indicating the pattern address of each pattern unit to be affected.

20. The method of claim 1, wherein said searching is effected in a data structure containing at least part of the electronic representation, said data structure comprising a set of records, each record comprising a pattern address field and a state indicator field.

21. The method of claim 20, wherein each record represents one allotment request.

22. The method of claim 20, wherein each record represents pattern units that have been allotted to a set of pages of an electronic document.

23. The method of claim 20, wherein each record comprises a field that indicates the number of allotted pattern units.

24. The method of claim 20, wherein each record represents one pattern unit.

25. The method of claim 20, wherein said setting of the state indicator comprises deleting a record from said data structure.

26. The method of claim 20, wherein the electronic representation comprises an ordering of the pattern units as defined by the pattern addresses, said method further comprising:
    locating, in said data structure, records that have both a state indicator field in the released state and adjacent pattern addresses in said ordering; and
    merging the located records.

27. The method of claim 1, further comprising:
    deriving at least one destination indicator from said allotment request, and storing the destination indicator in association with the pattern addresses of said number of pattern units.

28. An arrangement for allotting pattern units of an overall coding pattern in an information management system, said arrangement comprising:
    a storage unit which contains an electronic representation of the overall coding pattern;
    a first interface; and
    a processing unit which comprises:
        means for receiving, on the first interface, an allotment request for a number of pattern units;
        means for searching said representation in the storage to locate said number of pattern units available for allotting;
        means for setting a state indicator of said number of pattern units in said representation to indicate an allotted state;
        means for outputting, on the first interface, an indication of the pattern addresses of said number of pattern units; and
        means for selectively changing, from the allotted state to a released state, the state indicator of at least one pattern unit whose state indicator is set to the allotted state.

29. The arrangement of claim 28, wherein said system comprises a generation tool which coordinates the generation of a product with a coding layer that is based on said number of pattern units, said first interface being adapted for communication with said generation tool.

30. The arrangement of claim 28, further comprising a second interface, wherein the processing unit comprises means for receiving, on the second interface, a request for state change indicating the pattern address of each pattern unit to be affected.

31. The arrangement of claim 30, wherein data is selectively transferred in said system to a plurality of destination units, said second interface being adapted for communication with the destination units.

32. The arrangement of claim 28, wherein the processing unit further comprises:
    means for receiving, on the first interface, at least one data identifier which is associated with the allotment request; and
    means for storing the data identifier in said representation in association with said number of pattern units.

33. The arrangement of claim 32 further comprising a second interface, wherein the processing unit further comprises:
    means for receiving, on the second interface, a data identifier request indicating at least one pattern address;
    means for identifying a data identifier in said representation based on the patter address; and
    means for outputting, on the second interface, the thus-identified data identifier.

34. The arrangement of claim 28, wherein the processing unit further comprises means for selectively changing the state indicator of at least one pattern unit from the allotted state to a locked state.

35. The arrangement of claim 34, wherein the locked state indicates that information relating to the pattern unit is to be blocked from being transferred in said system.

36. The arrangement of claim 34, wherein the processing unit further comprises means for selectively changing the state indicator of at least one pattern unit from the locked state to the allotted state.

37. The arrangement of claim 28, wherein the processing unit further comprises:
    means for receiving, on the first interface, at least one destination indicator; and
    means for storing the destination indicator in association with the pattern addresses of said number of pattern units.

38. The arrangement of claim 37, further comprising a third interface, wherein the processing unit comprises:
    means for receiving, on the third interface, a destination indicator request indicating at least one pattern address;
    means for identifying a destination indicator in said representation based upon the pattern address; and
    means for outputting, on the third interface, the thus-identified destination indicator.

39. The arrangement of claim 38, wherein said system comprises a flow controller which directs data associated with at least one of said pattern units to one of a plurality of destination units, said third interface being adapted for communication with said flow controller.

40. An information management system, comprising:
    a generation tool which coordinates the generation of a product with a coding layer that is based on a number of pattern units;
    a flow controller which directs data recorded by an electronic pen on the product to one of a plurality of destination units, said data being associated with at least one of said number of pattern units;

a storage unit which contains an electronic representation of an overall coding pattern;
a first interface; and
a processing unit comprising:
  means for receiving, on the first interface, an allotment request for the number of pattern units;
  means for searching said representation in the storage to locate said number of pattern units available for allotting;
  means for setting a state indicator of said number of pattern units in said representation to indicate an allotted state;
  means for outputting, on the first interface, an indication of the pattern addresses of said number of pattern units; and
  means for selectively changing, from the allotted state to a released state, the state indicator of at least one pattern unit whose state indicator is set to an allotted state,
wherein the processing unit communicates at least with the generation tool.

41. A method in an information management system which controls the flow of data from an electronic pen to one of a plurality of destination units, said data being associated with a position-coded product, said method comprising:
  allotting at least one pattern unit of an overall coding pattern for the generation of said position-coded product;
  selectively setting a state indicator for each allotted pattern unit to indicate one of a plurality of states; and
  controlling the flow of data, from the electronic pen to said one of the plurality of destination units, at least partly based on the state indicator.

42. The method of claim 41, wherein said state indicator is indicative of an allotted state, to signify that any data associated with the allotted pattern unit is enabled for transmission to said one destination unit.

43. The method of claim 42, wherein said state indicator indicative of an allotted state is associated with a destination indicator, said destination indicator being indicative of a communication address of said one destination unit.

44. The method of claim 41, comprising irreversibly blocking any data associated with the allotted pattern unit from transmission to said one destination unit by setting said state indicator to indicate a released state.

45. The method of claim 44, wherein the allotted pattern unit, in said released state, is made available for further allotting.

46. The method of claim 41, comprising reversibly blocking any data associated with the allotted pattern unit from transmission to said one destination unit by setting said state indicator to indicate a locked state.

* * * * *

UNITED STATES PATENT AND TRADEMARK OFFICE
CERTIFICATE OF CORRECTION

| | | |
|---|---|---|
| PATENT NO. | : 7,861,939 B2 | Page 1 of 1 |
| APPLICATION NO. | : 10/578253 | |
| DATED | : January 4, 2011 | |
| INVENTOR(S) | : Romedahl et al. | |

It is certified that error appears in the above-identified patent and that said Letters Patent is hereby corrected as shown below:

In claim 33, column 12, lines 24-25, "means for identifying a data identifier in said representation based on the patter address" should read -- means for identifying a data identifier in said representation based on the pattern address --.

Signed and Sealed this
Twenty-second Day of March, 2011

David J. Kappos
*Director of the United States Patent and Trademark Office*